(12) United States Patent
Yablokov (10) Patent No.: US 10,133,880 B2
(45) Date of Patent: Nov. 20, 2018

(54) SYSTEM AND METHOD OF PREVENTING UNFAIR EVALUATION OF APPLICATIONS BY USERS

(71) Applicant: AO Kaspersky Lab, Moscow (RU)

(72) Inventor: Victor V. Yablokov, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 0 days.

(21) Appl. No.: 15/627,566

(22) Filed: Jun. 20, 2017

(65) Prior Publication Data

US 2018/0165467 A1    Jun. 14, 2018

(30) Foreign Application Priority Data

Dec. 12, 2016    (RU) ................................ 2016148492

(51) Int. Cl.
G06F 7/04        (2006.01)
G06F 21/62       (2013.01)
G06F 21/31       (2013.01)
G06Q 30/02       (2012.01)

(52) U.S. Cl.
CPC ............ G06F 21/629 (2013.01); G06F 21/31 (2013.01); G06Q 30/0282 (2013.01)

(58) Field of Classification Search
CPC .... G06F 21/629; G06F 21/31; G06Q 30/0282
USPC ......................................................... 726/28
See application file for complete search history.

(56) References Cited

U.S. PATENT DOCUMENTS

| 2005/0060565 A1* | 3/2005 | Chebolu ............... H04L 63/102 726/26 |
| 2010/0299735 A1* | 11/2010 | Jiang ..................... G06F 21/305 726/7 |
| 2011/0145908 A1* | 6/2011 | Ting ........................ G06F 21/32 726/7 |
| 2014/0189829 A1 | 7/2014 | McLachlan et al. |

(Continued)

FOREIGN PATENT DOCUMENTS

EP    2765550 A1    8/2014

OTHER PUBLICATIONS

App Ratings—What they mean and how to Restrict by Rating: Be Web Smart, by Anonymous, Retrieved from internet Oct. 19, 2017 www.bewebsmart.com/ipod-ipad-iphone/how-to-restrict-apps-by-rating.

(Continued)

Primary Examiner — Mohammad W Reza
(74) Attorney, Agent, or Firm — Arent Fox LLP (57) ABSTRACT

Disclosed are systems and methods for blocking access to interface elements of a page of an application in an applications store. The computing device executes executing a restrictive application that restricts use of the computing device. The restrictive application can determine that a page of the application in the application store is being presented on a display of the computing device and block access to interface elements of the application page, thereby preventing punitive evaluations of the restrictive application. To restore access to the application store page, the restrictive application may obtain authentication data associated with an authorized user, and responsive to determining that the obtained authentication data satisfies one or more conditions for unblocking, provide access to the interface elements of the page of the application in the applications store.

20 Claims, 3 Drawing Sheets

(56) References Cited

U.S. PATENT DOCUMENTS

2014/0230053 A1    8/2014  Mote et al.
2014/0244803 A1    8/2014  Kang et al.
2017/0104791 A1*   4/2017  Cooper .................. H04L 63/20

OTHER PUBLICATIONS www.imore.com/how-enable-parental-control-restrictions-your-iphone-or-ipad; Write a Review of Google Play, Retreived on Oct. 19, 2017.

Extended European Search Report dated Oct. 19, 2017 for EP17187875.

* cited by examiner

SYSTEM AND METHOD OF PREVENTING UNFAIR EVALUATION OF APPLICATIONS BY USERS

CROSS-REFERENCE TO RELATED APPLICATIONS

This application claims benefit of priority under 35 U.S.C. 119(a)-(d) to a Russian Application No. 2016148492 filed on Dec. 12, 2016, which is incorporated by reference herein

FIELD OF TECHNOLOGY

The present disclosure relates generally to the field of software and, more specifically to systems and methods of preventing unfair evaluations of applications by users.

BACKGROUND

The use of smartphones, tablet and other mobile computing devices has reached great popularity in the modern society. This fueled tremendous growth in the development of mobile applications that run on the mobile computing devices. In the majority of cases, these mobile applications are downloaded by users from an application store, such as Google Play or the App Store. In addition to the applications, these stores provide the users of mobile computing devices with an opportunity to familiarize themselves with a description of a particular application, view screen shots of the application, evaluate it and leave a feedback.

There are a number of applications designed to restrict the use of the device on which they are installed. Such applications include, for example, applications of "parental control" type, such as Kaspersky Safe Kids, or KES for Android. In general case, such restrictive applications are designed so that the user of the device, such as a child, cannot use game applications too long, or visit certain sites, for example. The restrictive nature of such applications is such that the user of a mobile device having limited, restricted capabilities/permissions (e.g., restrictions on access to certain websites or applications) is not satisfied with the presence of such a restrictive application on his/her computing device. Accordingly, such dissatisfied users may submit punitive negative feedback in the application stores, which unfairly negatively impacts the other users trusting such an application. The negative feedback from a user having restricted capabilities (meaning in the present case the capabilities of using the computing device) might only indicate about how the restrictive application handles its task well. It is important to note that the capability of evaluating such an application in the applications store should not be available to a user who is restricted and dissatisfied with the application, but rather to a person who installs (or initiates the installing of) the restrictive application (for example, in the case of the Kaspersky Safe Kids application, this is the parent of the child who is using the device, whereas the capabilities of the child using the device are in fact restricted by the application).

Various methods are used to prevent unfair evaluations having a negative impact on the trust placed in applications, including methods which analyze the nature of a change in evaluations: whether it is similar to the evaluations produced using bot nets or not. Although these methods are aimed at solving certain problems in the area of identifying unfair evaluations, they do not solve the problem of preventing such evaluations or solve it inefficiently. Accordingly, there is a need for improvements in this area of technology.

SUMMARY

Disclosed are systems and methods of preventing unfair evaluations of applications by users by means of blocking access to the elements of the application page interface in an applications store to unauthenticated users of a computing device and allowing access to the application page interface when user's authentication data satisfy unblocking conditions.

In one exemplary aspect, a method for blocking access to interface elements of a page of an application in an applications store comprises: executing a restrictive application that restricts use of a computing device; determining that the page of the application in the applications store is being presented on a display of the computing device during execution of the restrictive application; blocking, by the restrictive application, access to one or more interface elements of the page of the application in the applications store; obtaining authentication data associated with an authorized user; and responsive to determining that the obtained authentication data satisfies one or more conditions for unblocking, providing access, by the restrictive application, to the interface elements of the page of the application in the applications store.

In one exemplary aspect, determining that the page of the application in the application is being presented on the display of the computing device further comprises: receiving data from an operating system of the computing device upon occurrence of an event associated with an accessibility API of the operating system, wherein the received data comprises data related to a graphical user interface of the computing device; and applying the received data to one or more heuristic rules.

In one exemplary aspect, determining that the page of the application in the application is being presented on the display of the computing device further comprises: matching a name of the application on the page to a pre-determined list of restrictive applications selected to prevent punitive evaluations against the restrictive applications.

In one exemplary aspect, blocking access to the interface elements of the page of the application in the applications store further comprises: blocking access to a control element configured to submit an evaluation related to the application in the application store.

In one exemplary aspect, blocking access to the interface elements of the page of the application in the applications store further comprises: generating a blocking user interface element in a foreground of the interface elements of the page of the application in the applications.

In one exemplary aspect, the application whose page is being displayed to the user is the restrictive application executing on the computing device.

In one exemplary aspect, the page of the application contains at least one of a name of the application and a rating of the application.

In one exemplary aspect, the applications store comprises a remote server for distributing applications for an operating system of the computing device and having a separate page corresponding to each application.

In one exemplary aspect, a system for blocking access to interface elements of a page of an application in an applications store comprises: a computing device having a display; an intercept module configured to determine that a page of the application in the application store is being presented on the display during execution of a restrictive application configure to restrict use of the computing device; and a blocking module configured to: block access to one or more interface elements of the page of the application in the applications store; obtain authentication data associated with an authorized user; and responsive to determining that the obtained authentication data satisfies one or more conditions for unblocking, provide access to the interface elements of the page of the application in the applications store.

In one exemplary aspect, a non-transitory computer readable medium storing thereon computer executable instructions for blocking access to interface elements of a page of the application in the applications store, includes instructions for: executing a restrictive application that restricts use of a computing device; determining that a page of the application in the applications store is being presented on a display of the computing device during execution of the restrictive application; blocking, by the restrictive application, access to one or more interface elements of the page of the application in the applications store; obtaining authentication data associated with an authorized user; and responsive to determining that the obtained authentication data satisfies one or more conditions for unblocking, providing access, by the restrictive application, to the interface elements of the page of the application in the applications store.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product of preventing unfair evaluations of applications by users of mobile devices. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following terms will be used throughout this disclosure:

Authentication data includes data used for the authentication of the user of a mobile computing device. The authentication data is at least a password, a gesture (or lock pattern), entered by means of a touchscreen, a voice command or any other information which allows an identification of the user of the computing device (and which can also be entered using the entry devices/interfaces of the mobile computing device).

An applications store may include a remote server for the distribution of at least applications for the Android, iOS and Windows Phone OS, one application (or group of applications) corresponding to a separate page in the applications store which can be displayed on the computing device (for example, a web page corresponding to the application which can be displayed by an Internet browser on the computing device, or a page of an application which can be displayed in the application for access to the applications store). Examples of applications stores are: Google Play, App Store, Windows Store and others. The page of the application contains at least: the name of the application, the rating of the application, the name of the developer of the application (or the owner of the application), information on age limits for the application (age category), and also the category of the application ("sports", "business", "finance", etc.). The page of the application can furthermore display a description of the corresponding application, and also the number of downloads of the application from the remote server onto mobile computing devices.

A restrictive application may include an application which restricts the possibility of use of the computing device on which it is running in any way. For example, the restrictive application may block access to remote network resources, block access to certain websites, or block execution of certain other applications installed on the computing device. In another example, the restrictive application may restrict an amount of time spent on the device in a single session or over a certain time period. An example of such an application is Kaspersky Safe Kids or KES for Android.

Figure 1:
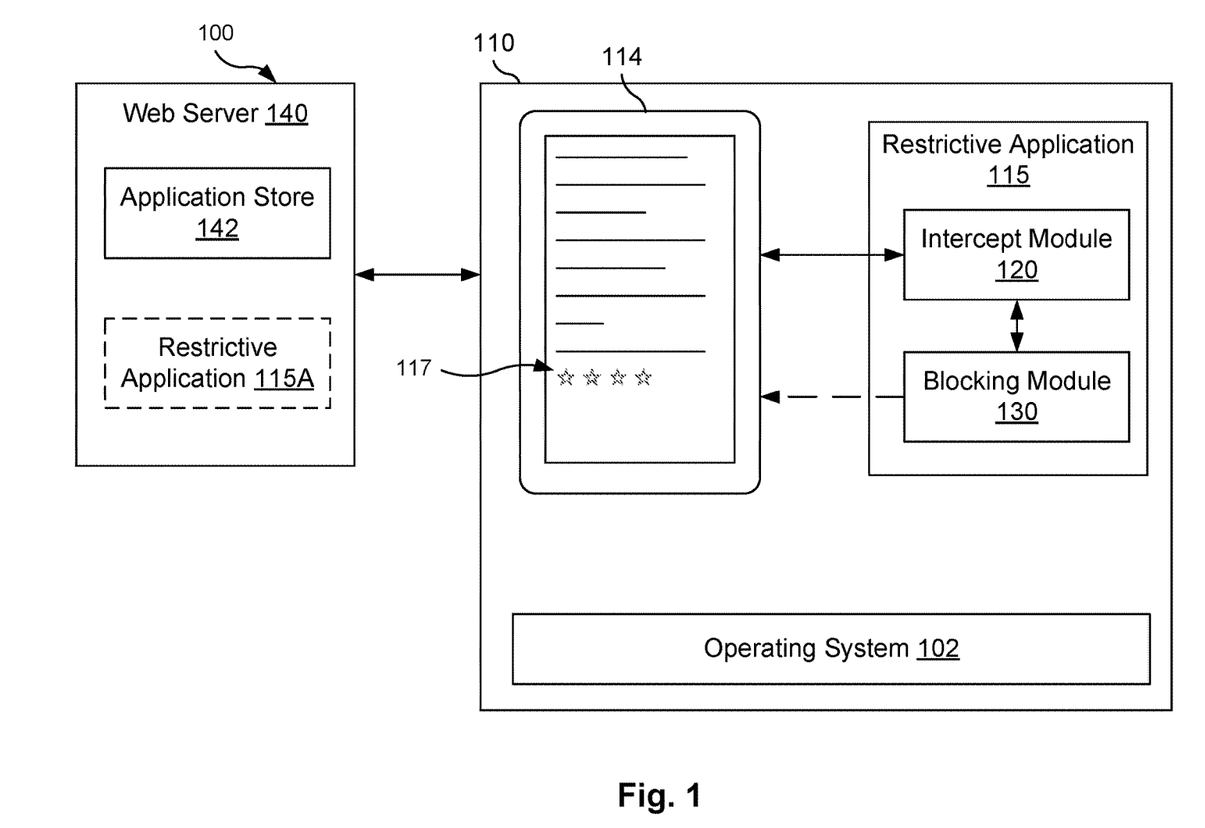
FIG. 1 illustrates an exemplary aspect of a system of preventing unfair evaluations of applications by users.

FIG. 1 illustrates an exemplary aspect of a system of preventing unfair evaluations of applications by users by means of blocking access to the interface elements of the page of an application in the applications store. The system 100 includes a computing device 110 (e.g., a smartphone, a table, a PC), an operating system (OS) 102 of the computing device 110, and a restrictive application 115 (e.g., security application), which may include, but not limited to an intercept module 120 and a blocking module 130. In one exemplary aspect, the restrictive application 115 may be installed on the computing device 110. In another exemplary aspect, the restrictive application 115 may be component of an application store 142 run from a web server 140 (shown in FIG. 1 as a restrictive application 115A in a dashed outline).

In one exemplary aspect, the intercept module 120 may be configured to determine whether a page 114 of an application in the applications store 142 (hereinafter for convenience being called the "application page 114") is being displayed on a screen of the computing device 110. In some exemplary aspects, the page 114 of the application in the applications store 142 is considered displayed on the screen if the page is part of a graphical user interface rendered and displayed by the computing device 110. Said application page 114 can be displayed on the screen of the computing device 110 with the aid, for example, of an application for access to the applications store—for the operating systems of the Android family such applications can be the Android Market or Play Market applications. In another exemplary aspect, any other software installed on the computing device 110 and able to display web pages is used to display the application page. In a particular instance, the intercept module 120 determines the fact of the displaying on the screen of the computing device 110 of the application page from the applications store in two steps. In another particular instance, the first step, described below, may be omitted.

In the first step, the intercept module 120 determines that there is being displayed on the screen of the computing device an application which is able to display the application pages. In one exemplary aspect, the determination is done in the event that the name of the process (or the package name) whose window (or activity in the Android OS) is displayed to the user (foreground activity) coincides with the name of one of the applications for access to the applications store. Examples have been given above, while the full list of applications for access to the applications store can be stored either in the intercept module 120 or in a database connected to the module 120 or on a remote server, in a particular aspect the developers of the restrictive applications may correct this list.

After determining that an application capable of displaying the application pages is being displayed on the screen of the computing device, the intercept module 120 in the second step determines that an application page is being displayed on the screen of the computing device 110 on the basis of the data being displayed on the screen of the computing device. The intercept module 120 uses an accessibility application programming interface (Accessibility API) in order to obtain the data being displayed on the screen of the computing device.

As used herein, an accessibility API is a set of functions exposed by an operating system 102 and designed for the creation of applications suitable for users with disabilities or limited abilities. Applications that support an accessibility API are configured to expose information relating to the user interface of the application including both control elements and data contained in the application so as to allow programmatic access (via the accessibility API) by an accessibility application. On the other side, applications that provide user interface enhancements to assist users with disabilities, for example, a screen reader application, can register with the OS as a system-level accessibility service to gain access to data relating to the graphical user interface being displayed on the screen of the computing device.

In order to obtain the data being displayed on the screen, the intercept module 120 receives from the OS 102 access rights for the processing of events (for example, by indicating the corresponding rights in the manifest, while said rights may be granted to the module 120, for example, during its installation on the computing device 110), which are described in the Android OS 102 in the context of an AccessibilityEvent structure and designed for processing on the part of agencies providing services to users with limited abilities (AccessibilityService). In a particular aspect, the rights to the processing of said events are provided by the user of the computing device 110, in yet another particular aspect said user is the administrator of the device 110 or the user of the restrictive application (who has the rights to use this application, for example, knows the password for access to it). In an exemplary aspect, such events in the OS are events designated as follows in the OS (the list of events may be enlarged and is not restricted to the examples shown):

TYPE_VIEW_CLICKED,
TYPE_VIEW_LONG_CLICKED,
TYPE_VIEW_FOCUSED,
TYPE_VIEW_SELECTED,
TYPE_VIEW_SCROLLED.

Upon occurrence of one of the above-mentioned events in the OS, the operating system sends data describing the information being displayed on screen, such as the displayed text, to the registered system services, namely, the intercept module 120. In the general case, the intercept module 120 receives data from the OS which is formed by the operating system of the computing device 110 upon occurrence of the event designed for processing by accessibility services for providing services to users with limited abilities (AccessibilityService). In a particular instance, such data is a text representation of the information being displayed on the screen of the computing device 110—both text and certain pictograms. In one exemplary aspect, the aforementioned data also contains the name of the event (one of the aforementioned names of type "TYPE_VIEW . . . "), the name of the application during whose working one of the aforementioned events occurred, and also the name of the class (Class Name) of the interface element of the working application (such as "android.widget.ImageView" or "ImageView"), where the aforesaid interface element is connected to the event which has occurred (for example, for the event TYPE_VIEW_CLICKED such elements might be buttons, while the connected events and elements are represented in the class description AccessibilityEvent for OS); in the general case, the interface element is connected to the event if the interaction of the user with the mentioned element (such as pressing) generates said event (in a particular case, with the help of the OS means). It should be noted that, in some exemplary aspect, the interface elements of the application are at least a button and a text field. In yet another exemplary aspect, said data also contains attributes of the interface element related to the event which has occurred (for example, the text contained in the element or a full list of attributes provided by the operating system).

The intercept module 120 may use the aforementioned data (hereinafter, "Data") obtained from the OS to determine that the application page is being displayed on the screen of the computing device 110. In one exemplary aspect, the intercept module 120 may use one or more heuristic rules applicable to the Data to make this determination. For example, if the Data contains attributes of the interface elements, among the attributes there being the names of applications from a pre-determined list of applications, then the intercept module 120 determines (detects, acknowledges) that the application page is being shown on the display of the computing device 110. In another example of a heuristic rule, if the Data contains attributes of the interface elements, among the attributes there being the names of applications from a pre-determined list of applications, the names being attributes of interface elements whose class is one of: "Button", "ImageView", "TextView", then the intercept module 120 determines that the application page is being shown on the display of the computing device 110.

In another exemplary use of a heuristic, if the Data contains attributes of the interface elements, among the attributes there being the names of applications from a previously organized list of applications, and also the names of the developers from a pre-determined list of developers, while said names are attributes of interface elements whose class is one of: "Button", "ImageView", "TextView", then the intercept module 120 determines that the application page is being shown on the display of the computing device 110.

In another exemplary heuristic rule, if the Data contains attributes of the interface elements, among the attributes there being the names of applications from a pre-determined list of applications, and also the names of the developers from a pre-determined list of developers, while said names are attributes of interface elements whose class is one of: "Button", "ImageView", "TextView", and also the Data contains the name of an event connected to one of the above-enumerated interface elements, the name of the event being one of TYPE_VIEW_CLICKED, TYPE_VIEW_SCROLLED, then the intercept module 120 determines that the application page is being shown on the display of the computing device 110;

In one exemplary aspect, there is added to the above-described rules a condition whereby the intercept module 120 does not determine that an application page is being shown on the display of the computing device 110 if the Data contains attributes of the interface elements, among the attributes being names of applications from a pre-determined list of applications, and these names are attributes of interface elements whose class is "SearchBox".

The pre-determined list of applications (and also the pre-determined list of developers) can be organized by a specialist in information technology or provided by a remote server (not shown in FIG. 1) and handed over to the intercept module 120. In one exemplary aspect, the pre-determined list of applications contains at least the names of the restrictive applications, so that the intercept module 120 determines the displaying on the screen of the computing device of the page of a restrictive application in the applications store. In one exemplary aspect, the intercept module 120 determines that a page is being shown on the display of the computing device 110 if the conditions of at least two of the aforementioned heuristic rules are met. After determining the showing of the application page on the display of the computing device 110, the intercept module 120 may send a corresponding notification of this determination to the blocking module 130.

The blocking module 130 may be configured to block access to one or more interface elements of the application page 114 being shown on the screen of the computing device 110, to obtain authentication data entered at least with the help of an input device of the computing device 110, and also to grant access to the interface elements of the application page being shown on the screen of the computing device 110, for example in the case when the access was previously blocked by the blocking module 130.

In one exemplary aspect, the blocking module 130 may block access (for example, from a user) to interface elements 117 of an application page by placing in the foreground one or more interface elements (such as those belonging to another Activity in the Android OS) which do not allow the use of the interface elements of the application page (e.g., by covering them). That is, the covering interface elements may prevent a user from knowing the interface elements of the application 114 are available; and even if the user attempted to interact with the underlying interface elements, the foreground interface elements are configured and arranged in a manner that would capture user input according to the layering principles of a graphical user interface of the OS 102. In some exemplary aspects, such elements 117 on the application page (which are covered) may be text fields for writing comments on the corresponding application or interface elements for entering an evaluation of the application, such as buttons or pictograms (e.g., stars) corresponding to an evaluation from 1 to 5 for the application.

In one exemplary aspect, the blocking module 130, in addition to the aforementioned blocking, may be configured to restore access to the blocked user interface elements based on an authorization process performed by the user. The blocking module 130 may place on the screen of the computing device 110 at least an interface element (such as a text field) for entering authentication data. In another exemplary aspect, the interface element does not require displaying on the screen of the computing device and the blocking module 130 reads the data entered with the aid of the input devices of the computing device 110 (such as gestures entered with the aid of a touchscreen). The blocking module 130 receives the authentication data by one of the aforementioned methods (either with the use of an interface element, or from at least one of the input devices of the computing device 110). In one exemplary aspect of the present disclosure, the authentication data is entered by the user of the computing device 110.

After obtaining the authentication data, the blocking module 130 is able to provide access to the interface elements of the application page. In some exemplary aspects, access is provided by removing from the foreground the interface elements (previously added, for example, the aforementioned activity) which previously did not allow the use of (i.e., blocked) the interface elements 117 of the application page. In one exemplary aspect, the blocking module 130 provides access to the interface elements 117 of the application page responsive to determining that the authentication data entered satisfies at least one of the conditions for unblocking, otherwise the blocking module 130 does not provide access to the control elements on the applications page. An unblocking condition can be at least:
the authentication data entered matches up with the password for unblocking;
the authentication data entered matches up with the gesture for unblocking;
the authentication data entered matches up with the voice command for unblocking.

The password, gesture or command for unblocking can be stored in the blocking module 130, and can also be changed by an appropriate command from outside, for example, from the restrictive application, such as Kaspersky Safe Kids, or from the administrator of the computing device 110. In some exemplary aspects, the password, gesture or command for unblocking concurs with the corresponding password, gesture or command for access to the restrictive application (such as Kaspersky Safe Kids).

Figure 2:
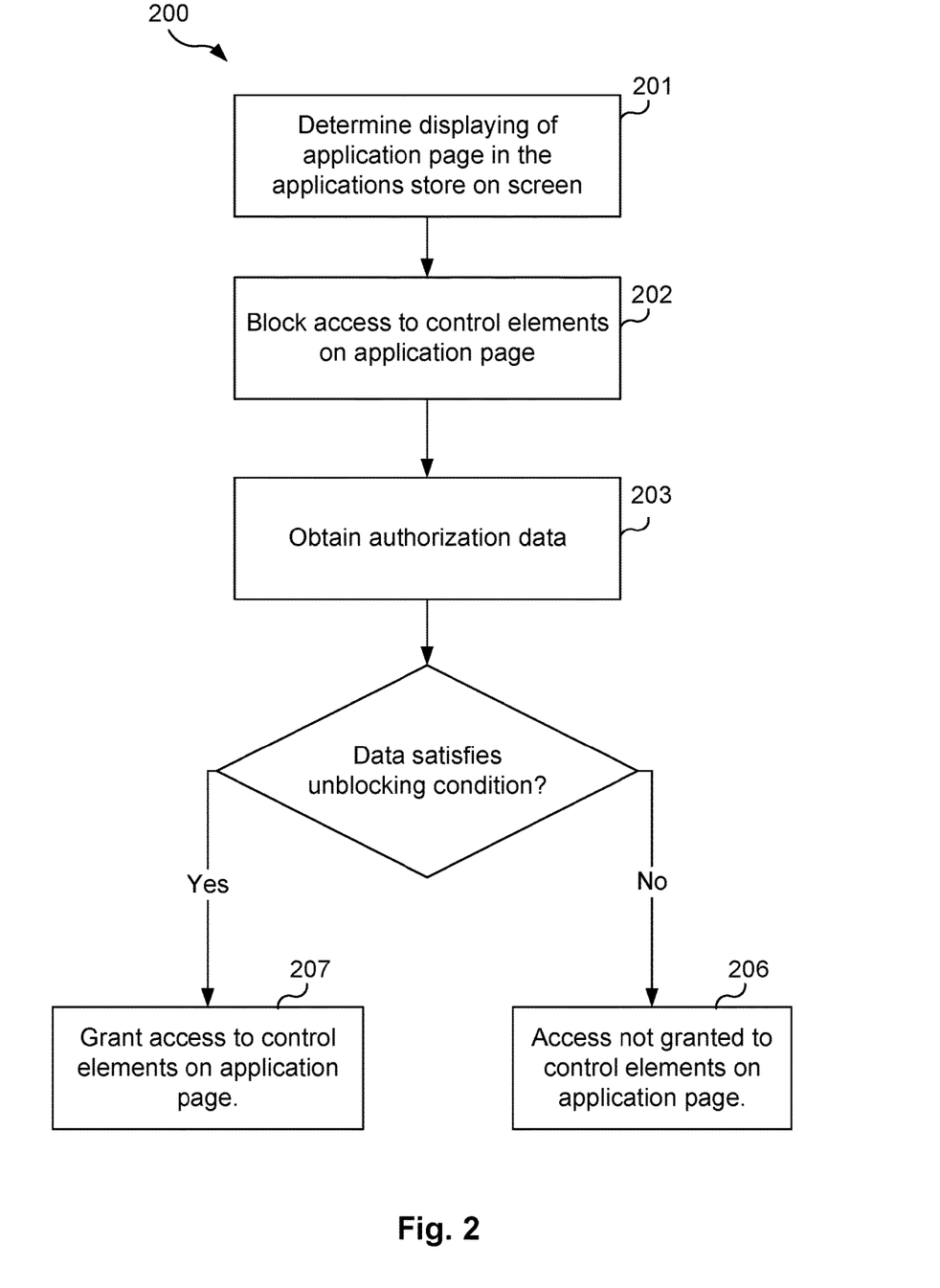
FIG. 2 illustrates an exemplary aspect of a method of preventing unfair evaluations of applications by users.

FIG. 2 illustrates an exemplary aspect of method 200 of preventing punitive evaluations of applications by users by blocking access to interface elements of an application page in an applications store. A computing device executes a restrictive application 115 that restricts use of a computing device. The applications store may be executing on a remote server for distributing applications for an operating system of the computing device and having a separate page corresponding to each application.

In step 201, the intercept module 120 determines that the application page is being shown on the display of the computing device 110 during execution of the restrictive application. In some exemplary aspects, the page of the application contains at least one of a name of the application and a rating of the application In some exemplary aspects, the application whose page is being displayed to the user is the restrictive application executing on the computing device. In some exemplary aspects, the intercept module 120 matches a name of the application on the page to a predetermined list of restrictive applications selected to prevent punitive evaluations against the restrictive applications.

The intercept module 120 may determine that the application page is being shown on the screen of the computing device 110 on the basis of data which is sent to the device 120, having been registered as a system accessibility service providing services to users with disabilities or limited abilities, from the OS upon occurrence of a number of events. In some exemplary aspects, the intercept module 120 receives data from the OS 102 of the computing device upon occurrence of an event associated with an accessibility API of the OS. This received data includes data related to a graphical user interface of the computing device. In one exemplary aspect, the determination that the application page is being shown on the display of the computing device 110 is done with the aid of heuristic rules (e.g., which can be applied to the received data).

If the intercept module 120 has determined that the application page is being shown on the screen of the computing device 110, a corresponding notification is sent by the intercept module 120 to the blocking module 130. In step 202 the blocking module 130 blocks access to the interface elements of the application page. In some exemplary aspects, the blocking module 130 blocks access to a control element, such as a button or a text field, configured to submit an evaluation or a feedback rating related to the application in the application store. In some exemplary aspects, the blocking module 130 generates a blocking user interface element in a foreground of the interface elements of the page of the application in the applications.

Next, in step 203, the blocking module 130 obtains authentication data entered at least with the aid of the input devices of the computing device 110. If the authentication data meets the condition for unblocking, then in step 207 the blocking module 130 provides access to the interface elements of the application page. Otherwise, the blocking module 130 in step 206 denies access to the interface elements of the application page (access remains blocked as of step 202).

Figure 3:
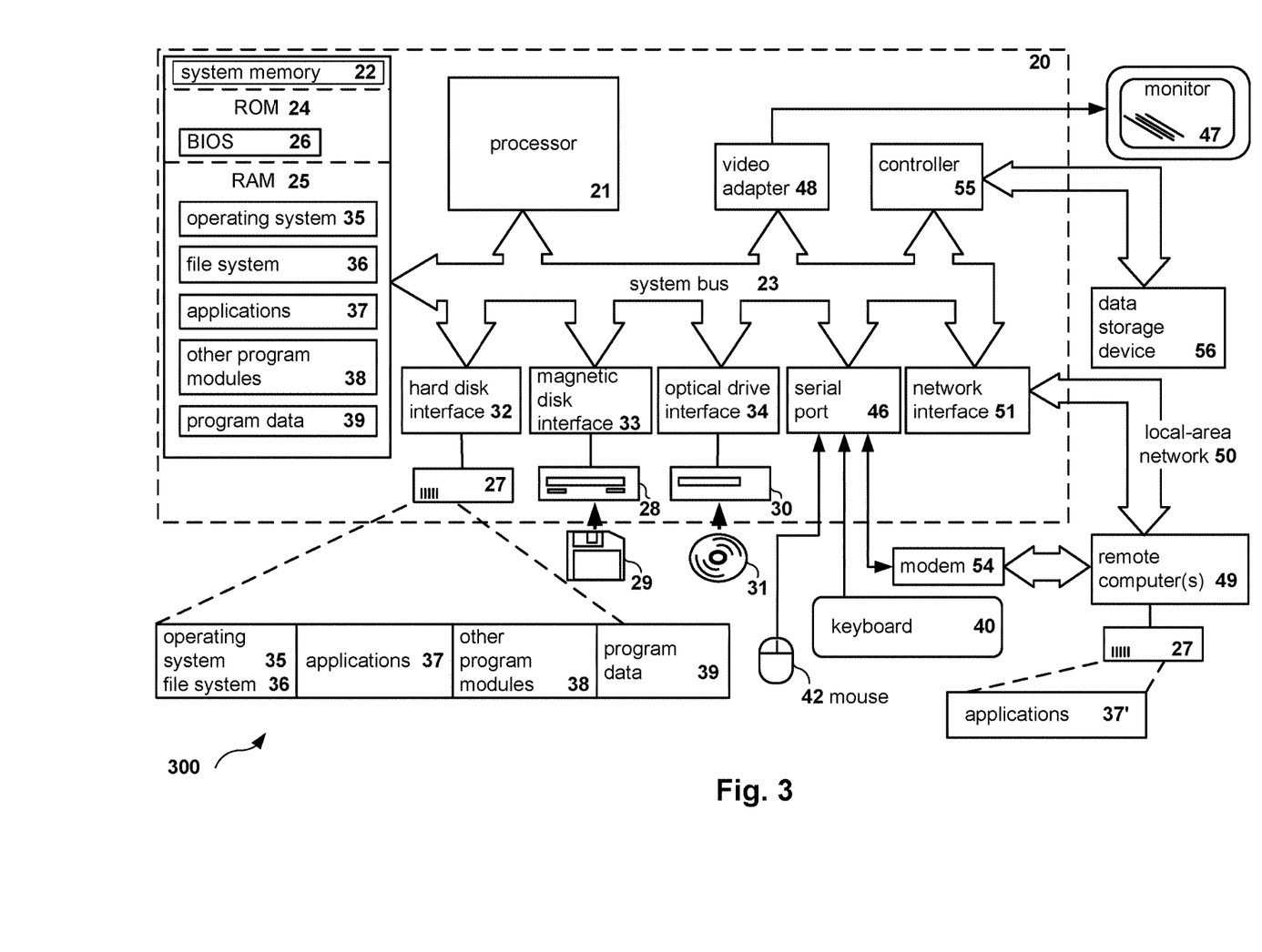
FIG. 3 illustrates an example of a general-purpose computer system enabling the implementation of disclosed systems and methods of preventing unfair evaluations of applications by users.

FIG. 3 is a diagram illustrating an example computer system on which aspects of systems and methods for preventing unfair evaluations of applications by users in accordance with an exemplary aspect of the invention. As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, as well as those based on neuromorphic chips (neurosynaptic chips), which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 3 above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for controlling access to interface elements of a page of an application in an applications store, the method comprising:
   executing a restrictive application that restricts use of a computing device;
   determining that a page of the restrictive application in the applications store is being presented on a display of the computing device during execution of the restrictive application by receiving access rights at the computing device using an accessibility application programming interface (API) for processing of events associated with the accessibility API of the computing device;
   blocking access to one or more interface elements of the page of the application in the applications store, wherein the one or more interface elements are controls for evaluation of the application in the applications store;
   obtaining authentication data associated with an authorized user using the computing device; and
   responsive to determining that the authentication data satisfies one or more conditions for unblocking, providing access to the interface elements of the page of the application in the applications store.

2. The method of claim 1, wherein determining that the page of the application in the applications store is being presented on the display of the computing device further comprises:
   receiving data from an operating system of the computing device upon occurrence of an event associated with the accessibility API of the operating system, wherein the received data comprises data related to a graphical user interface of the computing device; and
   applying the received data to one or more heuristic rules.

3. The method of claim 1, wherein determining that the page of the application in the applications store is being presented on the display of the computing device further comprises:
   matching a name of the application on the page to a pre-determined list of restrictive applications selected to prevent punitive evaluations against the restrictive applications.

4. The method of claim 1, wherein blocking access to the interface elements of the page of the application in the applications store further comprises:
   blocking access to a control element configured to submit an evaluation related to the application in the applications store.

5. The method of claim 1, wherein blocking access to the interface elements of the page of the application in the applications store further comprises:
   generating a blocking user interface element in a foreground of the interface elements of the page of the application in the applications store.

6. The method of claim 1, wherein the application whose page is being displayed to the user is the restrictive application executing on the computing device.

7. The method of claim 1, wherein the page of the application contains at least one of a name of the application and a rating of the application.

8. The method of claim 1, wherein the applications store comprises a remote server for distributing applications for an operating system of the computing device and having a separate page corresponding to each application.

9. A system for controlling access to interface elements of a page of an application in an applications store, the system comprising:
   a computing device having a display;
   an intercept module configured to determine that a page of the restrictive application in the applications store is being presented on the display during execution of a restrictive application configure to restrict use of the computing device, wherein determining that the page is being presented is performed by receiving access rights at the computing device using an accessibility application programming interface (API) for processing of events associated with the accessibility API of the computing device; and a blocking module configured to:
  block access to one or more interface elements of the page of the application in the applications store, wherein the one or more interface elements are controls for evaluation of the application in the applications store;
  obtain authentication data associated with an authorized user using the computing device; and
  responsive to determining that the authentication data satisfies one or more conditions for unblocking, provide access to the interface elements of the page of the application in the applications store.

10. The system of claim 9, wherein the intercept module configured to determine that the page of the application in the applications store is being presented on the display of the computing device is further configured to:
  receive data from an operating system of the computing device upon occurrence of an event associated with the accessibility API of the operating system, wherein the received data comprises data related to a graphical user interface of the computing device; and
  apply the received data to one or more heuristic rules.

11. The system of claim 9, wherein the intercept module configured to determine that the page of the application in the applications store is being presented on the display of the computing device is further configured to:
  match a name of the application on the page to a pre-determined list of restrictive applications selected to prevent punitive evaluations against the restrictive applications.

12. The system of claim 9, wherein the blocking module configured to block accessing to the interface elements of the page of the application in the applications store is further configured to:
  block access to a control element configured to submit an evaluation related to the application in the applications store.

13. The system of claim 9, wherein the blocking module configured to block access to the interface elements of the page of the application in the applications store is further configured to:
  generate a blocking user interface element in a foreground of the interface elements of the page of the application in the applications store.

14. The system of claim 9, wherein the application whose page is being displayed to the user is the restrictive application executing on the computing device.

15. The system of claim 9, wherein the page of the application contains at least one of a name of the application and a rating of the application.

16. The system of claim 9, wherein the system further comprises:
  a remote server executing the applications store for distributing applications for an operating system of the computing device and having a separate page corresponding to each application.

17. A non-transitory computer readable medium storing thereon computer executable instructions for controlling access to interface elements of a page of an application in an applications store, including instructions for:
  executing a restrictive application that restricts use of a computing device;
  determining that a page of the restrictive application in the applications store is being presented on a display of the computing device during execution of the restrictive application, by receiving access rights at the computing device using an accessibility application programming interface (API) for processing of events associated with the accessibility API of the computing device;
  blocking, access to one or more interface elements of the page of the application in the applications store, wherein the one or more interface elements are controls for evaluation of the application in the applications store;
  obtaining authentication data associated with an authorized user using the computing device; and
  responsive to determining that the obtained authentication data satisfies one or more conditions for unblocking, providing access to the interface elements of the page of the application in the applications store.

18. The non-transitory computer readable medium of claim 17, wherein the instructions for determining that the page of the application in the applications store is being presented on the display of the computing device further comprises instructions for:
  receiving data from an operating system of the computing device upon occurrence of an event associated with the accessibility API of the operating system, wherein the received data comprises data related to a graphical user interface of the computing device; and
  applying the received data to one or more heuristic rules.

19. The non-transitory computer readable medium of claim 17, wherein the instructions for determining that the page of the application in the applications store is being presented on the display of the computing device further comprises instructions for:
  matching a name of the application on the page to a pre-determined list of restrictive applications selected to prevent punitive evaluations against the restrictive applications.

20. The non-transitory computer readable medium of claim 17, wherein the instructions for blocking access to the interface elements of the page of the application in the applications store further comprises instructions for:
  blocking access to a control element configured to submit an evaluation related to the application in the applications store.

* * * * *